United States Patent Office.

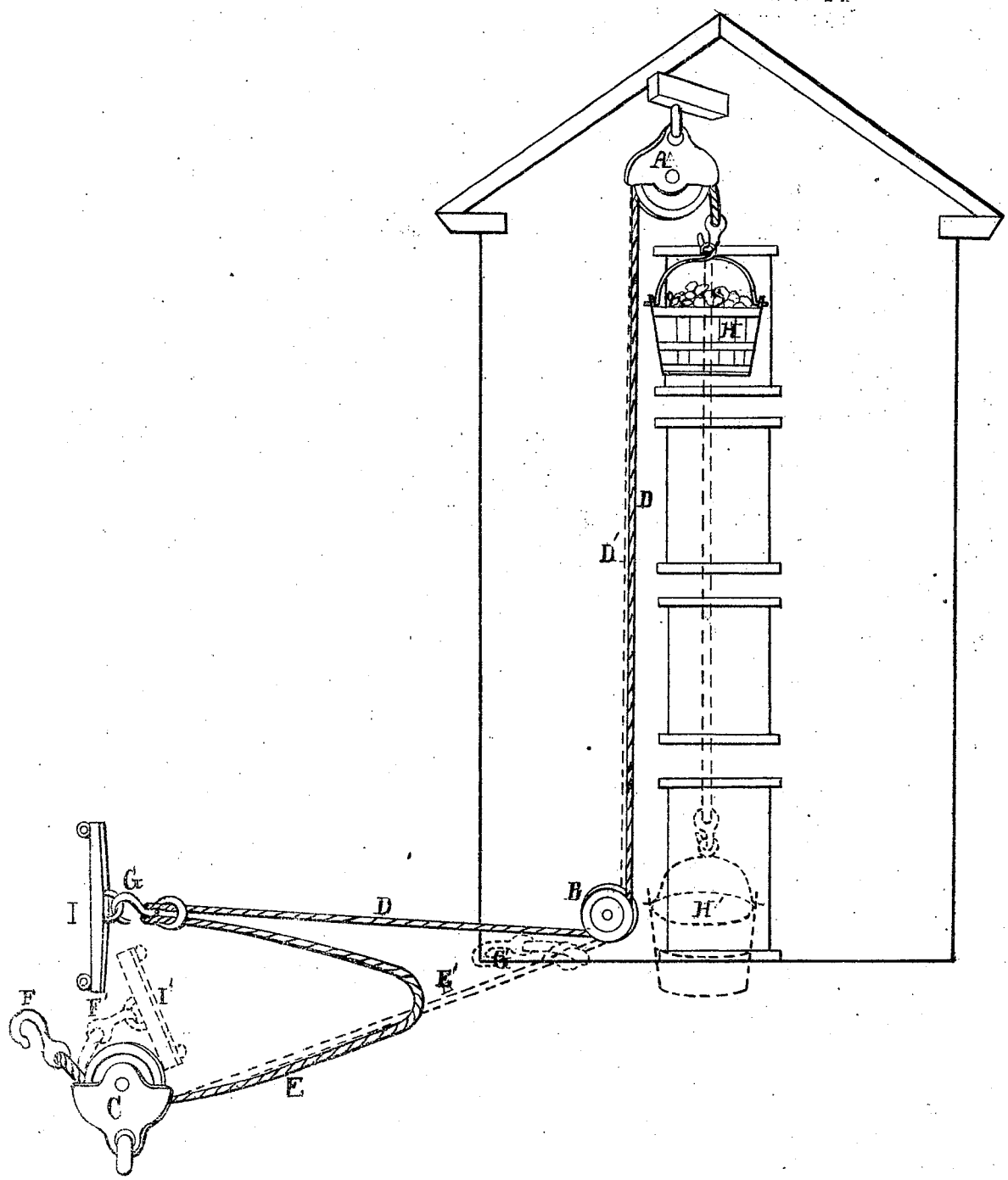

WILLIAM H. HAWLEY, OF UTICA, NEW YORK.

Letters Patent No. 71,303, dated November 26, 1867.

---

IMPROVEMENT IN APPARATUS FOR ELEVATING BY HORSE-POWER.

---

*The Schedule referred to in these Letters Patent and making part of the same.*

---

TO ALL WHOM IT MAY CONCERN:

Be it known that I, WILLIAM H. HAWLEY, of Utica, Oneida county, New York, have invented a new and useful Improvement in Apparatus for Elevating by Horse-Power; and I do hereby declare that the following is a full, clear, and exact description of my said invention and improvement, and of the mode of operation of the same, reference being had to the annexed drawings, making a part of this specification, which represents the improvement in perspective.

A is the upper pulley, B the lower one; C is the supplemental pulley; D D' are the draught-rope; E E' are the supplemental rope; F F' are a hook to connect with the whiffle-tree; G G' are the like hook on the main rope; H H' are the load; I I' are the whiffle-tree.

Where a load is to be raised by a horse drawing on a rope over pulleys, in the usual way, the horse moves in one direction the distance the load is raised, and he has either to be backed up or turned about and driven to the starting-point before the apparatus can descend for another load, and hence for every load raised he has to travel twice the distance the load is raised.

By my invention, which consists in the use of a supplemental rope and pulley, substantially as described, the horse elevates one load in going from and another in returning to the starting-point, and hence half of the travel is saved and more work may be done.

The supplemental rope E E' should be about equal in length to the height the load is to be raised. It is attached to the draught or main rope D at or near the hook G, or it may be hooked to the loop of the hook G. The pulley C may be any ordinary grooved pulley. It must be attached to the ground or to some convenient object, and at a distance from the pulley B equal to about the height the load is to be raised, and the rope E be placed around it, as seen in the drawing.

To operate the apparatus, the horse is attached to the draught-rope D by means of the whiffle-tree I and hook G, or other suitable contrivance, and he is driven from the starting-point near the pulley B until the load has reached the desired elevation. The hook G is then detached from the whiffle-tree I, and the weight of the apparatus while descending draws back the rope D and hook G, and with it the attached end of E, to the starting-point, as seen in the drawing. While another load is being attached to the draught-rope the horse is turned around and the whiffle-tree attached to the end of E on the pulley C, and he is driven toward B or first starting-point. This operates the same as drawing directly on D, and of course elevates the second load. When it has reached the desired elevation, the whiffle-tree is detached from E, and the apparatus again descends, and the hook on D, which had been drawn up to C, is again drawn back to B. The horse is again attached to D and started forward, and the third load is raised. The black lines indicate when the draught is direct and the red lines when the draught is toward the starting-point.

Instead of attaching the supplemental rope E to the draught-rope D, the whole may be in one piece, and the hook G attached to it by a loop or cord and loop at the proper distance from the end, as seen in the drawing, and thus the length of the ropes may be varied to correspond with the different heights the load is to be raised. When the supplemental rope is necessarily long it may be attached to the main rope by a ring, through which the draught-rope may slide, the hook on the draught-rope acting as a stop, by means of which the supplemental rope would not have to be drawn up and straightened out each time the draught-rope is drawn up or back. In elevating coal or the like, if the bucket should descend with too great force when the horse is unhitched, a counterbalance may be added to the draught-rope between the pulleys A and B, which will also serve to assist the horse in raising the load.

What I claim as my invention, and desire to secure by Letters Patent, is—

Attaching to and combining with the ordinary draught-rope and pulley or pulleys, the supplemental rope E and pulley C, for the uses and purposes mentioned.

WM. H. HAWLEY.

Witnesses:
HENRY GREEN,
JOHN G. CROCKER.